US00RE37843E

(19) United States
(12) Reissued Patent
Blumenthal et al.

(10) Patent Number: US RE37,843 E
(45) Date of Reissued Patent: Sep. 17, 2002

(54) APPARATUS FOR INFLATING A VEHICLE OCCUPANT RESTRAINT USING A MIXTURE OF GASES

(75) Inventors: Jack L. Blumenthal, Los Angeles; Nahum Gat, Manhattan Beach, both of CA (US); Ernst M. Faigle, Dryden, MI (US); John H. Semchena, Royal Oak, MI (US); Richard J. Thompson, Imlay City, MI (US)

(73) Assignee: TRW Vehicle Safety Systems Inc., Lyndhurst, OH (US)

This patent issued on a continued prosecution application filed under 37 CFR 1.53(d), and is subject to the twenty year patent term provisions of 35 U.S.C. 154(a)(2).

(21) Appl. No.: 08/718,194

(22) Filed: Sep. 19, 1996

Related U.S. Patent Documents

Reissue of:
(64) Patent No.: 5,348,344
Issued: Sep. 20, 1994
Appl. No.: 07/947,147
Filed: Sep. 18, 1992

U.S. Applications:
(63) Continuation-in-part of application No. 07/761,685, filed on Sep. 18, 1991, now abandoned.

(51) Int. Cl.[7] ..... B60R 21/26
(52) U.S. Cl. ..... 280/737; 222/3; 280/741
(58) Field of Search ..... 280/728.1, 732, 280/736, 737, 740, 741, 742; 102/530, 531, 204; 222/3; 422/164, 165, 166, 167

(56) References Cited

U.S. PATENT DOCUMENTS 2,850,291 A 9/1958 Ziccardi
3,180,373 A 4/1965 Hebenstreit
3,450,414 A 6/1969 Kobori
3,588,142 A 6/1971 Gorman (List continued on next page.)

FOREIGN PATENT DOCUMENTS

DE 4135547 A1 4/1993
EP 0445477 A2 9/1991
FR 2111442 6/1972

(List continued on next page.)

OTHER PUBLICATIONS

*Marks Mechanical Engineers Handbook*, Sixth Ed. NY McGraw–Hill Book Co. 1953 4–68–75.
*Introduction to Helium Mass Spectrometer Leak Detection*, Varian Associates, Inc., Palo Alto, Calif., 1980, pp. i, ii, and 21.
*Standard Handbook for Mechanical Engineers*, Baumeister, et al., McGraw–Hill Book Company, Eighth Edition, 1979, pp. iii, iv, 9–97 and 9–98.
*General Chemistry*, Timm, McGraw–Hill Book Company, Inc., Fourth Edition, 1944, pp. v, vi, and 69.

*Primary Examiner*—Eric Culbreth
(74) *Attorney, Agent, or Firm*—Tarolli, Sundheim, Covell Tummino & Szabo L.L.P.

(57) ABSTRACT

An apparatus for inflating a vehicle occupant restraint includes containing means for receiving gases to provide a combustible mixture of the gases. An igniter is activated to effect ignition of the mixture of gases in response to sudden vehicle deceleration. A directing means directs a flow of gas from containing means into the inflatable occupant restraint. In the preferred embodiment the gases are an inert gas, a fuel gas, and an oxidizer gas. Also, a lean mixture of a fuel gas and oxidizer gas could be used. An improved igniter transmits energy through an imperforate portion of a wall of the containing means to ignite a charge in the containing means. The igniter may include an elongate core disposed in a frangible sheath which is shattered as the core is burned.

95 Claims, 4 Drawing Sheets

U.S. PATENT DOCUMENTS

| | | | |
|---|---|---|---|
| 3,655,217 | A | 4/1972 | Johnson |
| 3,674,059 | A | 7/1972 | Stephenson |
| 3,723,205 | A | 3/1973 | Scheffee |
| 3,806,153 | A | 4/1974 | Johnson |
| 3,813,007 | A | 5/1974 | Doin et al. |
| 3,822,895 | A | 7/1974 | Ochiai |
| 3,868,124 | A | 2/1975 | Johnson |
| 3,895,821 | A | 7/1975 | Schotthoefer et al. |
| 3,966,226 | A | 6/1976 | Roth |
| 4,220,087 | A | 9/1980 | Posson |
| 4,791,805 | A | 12/1988 | Gates |
| 4,878,690 | A | 11/1989 | Cunningham |
| 4,890,680 | A | 1/1990 | Schneiter |
| 4,948,439 | A | 8/1990 | Poole et al. |
| 5,031,932 | A | 7/1991 | Frantom et al. |
| 5,033,772 | A | 7/1991 | Frantom et al. |
| 5,076,607 | A | 12/1991 | Woods et al. |
| 5,092,237 | A | 3/1992 | Beaufay et al. |

FOREIGN PATENT DOCUMENTS

| | | |
|---|---|---|
| FR | 2116949 | 7/1972 |
| FR | 2163795 | 7/1973 |
| FR | 2171107 | 9/1973 |
| FR | 2198440 | 3/1974 |
| FR | 2231543 | 12/1974 |
| GB | 1079484 | 8/1967 |
| JP | 4210098 | 5/1942 |
| JP | 507334 | 3/1975 |
| JP | 50112939 | 9/1975 |

APPARATUS FOR INFLATING A VEHICLE OCCUPANT RESTRAINT USING A MIXTURE OF GASES

Matter enclosed in heavy brackets [ ] appears in the original patent but forms no part of this reissue specification; matter printed in italics indicates the additions made by reissue.

RELATED APPLICATION

This application is a continuation-in-part of application Ser. No. 07/761,685 filed Sep. 18, 1991 by Jack L. Blumenthal and Nahum Gat and entitled "Apparatus for Inflating a Vehicle Occupant Restraint" now abandoned. The benefit of the earlier filing data of the aforementioned application Ser. No. 07/761,685 has been and hereby is claimed.

FIELD OF THE INVENTION

The present invention relates to a new and improved apparatus for inflating an inflatable device such as a vehicle occupant restraint.

BACKGROUND OF THE INVENTION

Known structures for inflating a vehicle occupant restraint are disclosed in U.S. Pat. Nos. 3,806,153, 3,868,124 and 3,895,821. In each of the structures disclosed in these patents, air, or other gas, and solid gas generating material are stored in a container. Upon the occurrence of a high rate of vehicle deceleration indicative of a collision, the gas in the container is released to inflate a vehicle occupant restraint which restrains a vehicle occupant during the collision. Also, upon the occurrence of a high rate of vehicle deceleration which is indicative of a vehicle collision, the gas generating material is ignited. As the gas generating material burns, it forms hot gases or vapors which heat and mix with the stored gas, and the heated mixture of gases flows into the occupant restraint.

SUMMARY OF THE INVENTION

The present invention provides a new and improved apparatus for inflating an inflatable device such as a vehicle occupant restraint. The apparatus includes a containing means for receiving gases to provide a combustible mixture of the gases. The apparatus also includes an igniter means for igniting the mixture of gases to warm and increase the pressure of gas in the containing means. The apparatus further includes a directing means which directs gas from the containing means to the inflatable device.

Preferably, the mixture of gases includes an inert gas, a flammable fuel gas and an oxidizer gas. The inert gas is preferably nitrogen or argon or a mixture of nitrogen and argon. The fuel gas is preferably hydrogen or methane or a mixture of hydrogen and methane but may be any other flammable gas. The oxidizer gas is preferably oxygen. Alternatively, the inert gas can be eliminated and a combustible gas mixture that is very fuel lean could be used. A small amount of an inert tracer gas such as helium may also be added to assist in leak checking the apparatus.

The containing means may take a variety of different forms. In one embodiment of the invention, the containing means is a single container for containing the inert gas, the fuel gas, and the oxidizer gas as a mixture of gases. Alternatively, the single container may contain the very fuel lean combustible gas mixture.

In another embodiment, a first container contains the fuel gas, a second container contains the oxidizer gas, and the containing means defines a combustion chamber which receives the fuel gas and oxidizer gas and in which the mixture of gases is ignited. In this embodiment the amount of oxidizer gas used is in excess of a stoichiometric amount to support combustion of the fuel gas.

In accordance with the present invention, the rate of inflation of the inflatable device can be controlled to provide a desired volume of the inflatable device at a given time after ignition of the fuel gas. The rate of inflation of and the pressure in the inflatable device can be controlled by selecting the amount of fuel gas and oxidizer gas to yield, a desired burning rate which in turn determines the predetermined volumetric rate of flow of warm gas into the inflatable device. Alternatively or additionally, the rate of inflation can be controlled by flow control orifices or the like through which the gas flows into the inflatable device. Another technique for controlling the time required for inflation is to change the number of locations in the containing means at which the fuel gas is ignited.

An improved igniter means is provided for igniting a mixture of gases. The igniter means is operable to transmit energy through an imperforate wall portion of the containing means. The energy transmitted through the imperforate wall portion of the containing means effects ignition of ignitable material in the containing means. Specifically, an ignitable charge located adjacent to an outer side of the imperforate wall portion of the containing means is ignitable to cause ignition of an ignitable charge which is disposed adjacent to an inner side of the imperforate wall portion of the containing means. In accordance with another feature of the igniter means, an elongated core in a frangible sheath is disposed in the containing means. The elongated core is ignited with a resulting shattering of the sheath and spewing of incandescent reaction products into the containing means.

BRIEF DESCRIPTION OF THE DRAWINGS

The foregoing and other features of the present invention will become apparent to those skilled in the art to which the present invention relates from reading the following specification with reference to the accompanying drawings, in which.

DESCRIPTION OF EMBODIMENTS OF THE INVENTION

Embodiment I

Figure 1:
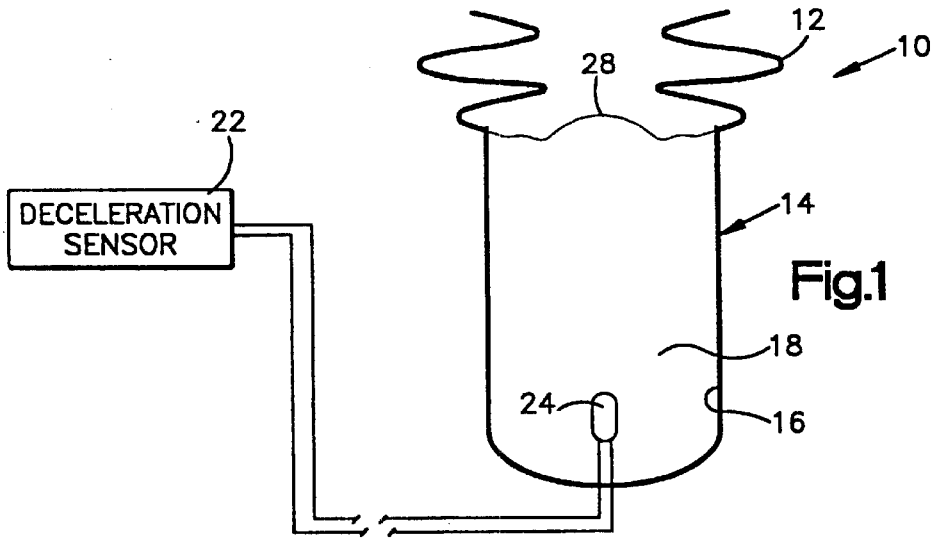
FIG. 1 is a schematic illustration of one embodiment of the present invention.

The present invention may be embodied in a number of different structures. As representative, FIG. 1 illustrates the present invention as embodied in a vehicle occupant safety apparatus 10. The vehicle occupant safety apparatus 10 includes an inflatable vehicle occupant restraint 12 and apparatus for inflating the vehicle occupant restraint.

Upon the occurrence of a high rate of vehicle deceleration which is indicative of a vehicle collision, the vehicle occupant restraint 12 is inflated to restrain movement of an occupant of the vehicle. The inflatable vehicle occupant restraint 12 is inflated into a location in the vehicle between the occupant and certain parts of the vehicle, such as the steering wheel, instrument panel or the like, before the occupant moves relative to those parts and forcibly strikes the parts during a vehicle collision. The inflated vehicle occupant restraint 12 absorbs kinetic energy of the occupant's movement and restrains the occupant's movement so that the occupant does not forcibly strike parts of the vehicle. Such a vehicle occupant restraint may be inflated by different gases. Notwithstanding the gas used to inflate the vehicle occupant restraint 12, the vehicle occupant restraint is commonly referred to as an air bag.

The vehicle occupant restraint 12 is inflated by a flow of gas form a container 14. The container 14 has a chamber 16 which holds a mixture 18 of gases. The mixture 18 of gases preferably includes a fuel gas, an oxidizer gas for supporting combustion of the fuel gas, and an inert gas. The inert gas is preferably nitrogen, argon or a mixture of nitrogen and argon. The oxidizer gas is preferably oxygen. The fuel gas is preferably hydrogen, but may be methane, or a mixture of hydrogen and methane which is a gaseous hydrocarbon.

Alternatively, the mixture of gases in container 14 may be an oxidizer gas and a fuel gas in amounts which provide a very fuel lean mixture, *i.e.,* the amount of oxidizer gas exceeds that amount required to support combustion of the fuel gas.

The mixture 18 of gases in the container 14 readily combusts, when ignited, but otherwise is not explosive. As such, the mixture 18 of gases could have many different compositions. The fuel gas may be 2 to 16 molar percent of the mixture 18 of gases. The oxidizer gas may be 7 to 98 molar percent of the mixture 18 of gases. The balance is inert gas which may be 0 to 91 molar percent of the mixture 18 of gases. Preferably, the mixture 18 of gases includes 10–14 molar percent hydrogen, 15–25 molar percent oxygen, and 61–75 molar percent inert gas.

The mixture 18 of gases in the container 14 is normally under pressure. The pressure depends upon such factors as the volume of the vehicle occupant restraint 12 to be inflated, the time available for inflation, the inflation pressure desired, the volume of the container for the mixture 18 of gases, and the percentage of each of the gases in the mixture 18 of gases. Normally, the mixture 18 of gases in the container 14 may be at a pressure of 500 to 5,000 pounds per square inch (psi). Preferably, the mixture 18 of gases in the container 14 is at a pressure of 1,000 to 3,000 psi. However, the invention is applicable to any mixture of gases regardless of pressure.

In one specific embodiment, the mixture 18 of gases is dry air and hydrogen. The mixture of dry air and hydrogen may range from 86 molar percent air and 14 molar percent hydrogen to 92 molar percent air and 8 molar percent hydrogen. However, it is presently preferred to have a range from 90 molar percent air and 10 molar percent hydrogen to 87 molar percent air and 13 molar percent hydrogen.

Upon the occurrence of sudden vehicle deceleration, a deceleration sensor 22, of any known and suitable construction, activates an igniter 24 in the chamber 16 to ignite the fuel gas in the mixture 18 of gases. The combustion of the fuel gas is supported by the oxidizer gas. As the fuel gas burns, the pressure in the chamber 16 rises due to warming of the gases by the heat of combustion created by burning of the fuel gas and the formation of additional gases or vapors produced by combustion of the fuel gas. After a predetermined time, or when a predetermined pressure is reached in the chamber 16, an end wall 28 of the container 14 bursts, and warm gas flows into the vehicle occupant restraint 12 through a flow controller orifice. As the gas flows into the vehicle occupant restraint 12, the gas inflates the vehicle occupant restraint 12 into a predetermined position for restraining a vehicle occupant.

If the amount of hydrogen is less than about 8 molar percent, difficulty may be encountered in igniting the hydrogen. If the amount of hydrogen is more than 14 molar percent, unacceptable pressures and/or temperatures may be created in the vehicle occupant restraint 12. Preferably, the fuel gas is included in the mixture 18 of gases in an amount so that it is substantially consumed by combustion in the container 14. The vehicle occupant restraint 12 is thus inflated almost exclusively, in the case where inert gas is used, by inert gas, combustion products and any remaining oxidizer gas or, in the case where inert gas is not used, by the remaining oxidizer gas and combustion products.

As the gas flows from the container 14 into the vehicle occupant restraint 12, the gas expands and cools. In addition, air from the environment around the safety apparatus 10 may be aspirated into the vehicle occupant restraint 12 as the vehicle occupant restraint is inflated. This aspirated air will also cool the gas in the vehicle occupant restraint 12.

Since the fuel gas in the mixture 18 of gases burns to generate heat which increases the pressure of the gas in the chamber 16, the total volume of gas which must be stored in the container 14 to inflate the vehicle occupant restraint 12 to a desired pressure is minimized. Additionally, since combustion of the fuel gas produces gaseous material, i.e., water vapor, instead of solid material, there is no need for a particulate filter or the like.

Figure 4:
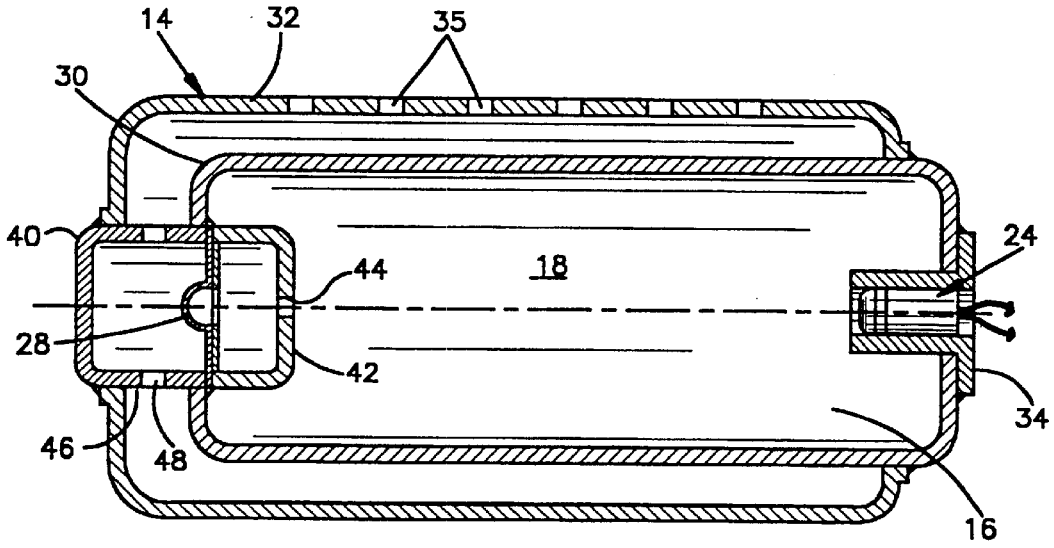
FIG. 4 is a sectional view of part of a vehicle occupant safety apparatus constructed in accordance with the present invention.

The container 14 in the safety apparatus 10 is shown in greater detail in FIG. 4. As shown in FIG. 4, the container 14 comprises a cylindrical tank 30. The tank 30 defines the chamber 16 containing the mixture 18 of gases The tank 30 must be made of a material impervious to the gases contained in the container. Therefore, the tank 30 may be made of a suitable metal, such as steel or aluminum, and may have a glass lining. A cylindrical gas flow diffuser 32 surrounds the tank 30. The diffuser 32 has a plurality of gas flow openings 35.

An igniter housing 34 extends through an opening at one end of the tank 30, and supports the igniter 24. The igniter 24 can be any one of many known types of igniters. Thus, the igniter can be a spark plug, flash bulb igniter (as shown, for example, in U.S. Pat. No. 3,695,179), or a pyrotechnic igniter. The specific igniter 24 shown in FIG. 4 is a known squib containing a pyrotechnic material which is preferably zirconium potassium perchlorate. A single igniter, as shown in FIG. 4, or a plurality of igniters can be used. The percentage of fuel gas in the mixture 18 of gases may be varied to facilitate ignition of the fuel gas by the igniter or igniters.

A cylindrical manifold 40 extends through an opening in the end of the tank 30 opposite the igniter 24 and also extends through an adjacent opening in the diffuser 32. A circular end wall 42 of the manifold 40 located inside the tank 30 has a centrally located control orifice 44. A cylindrical side wall 46 of the manifold 40 has a circumferentially extending array of gas flow openings 48 located between the tank 30 and the diffuser 32. The end wall 28, shown schematically in FIG. 1, is a burst disk supported inside the manifold 40 between the control orifice 44 and the gas flow openings 48.

When the fuel gas in the mixture 18 of gases in the chamber 16 is ignited by the igniter 24, combustion of the fuel gas generates heat and gaseous products of combustion which increase the pressure in the chamber 16. When the increasing pressure in the tank 30 reaches a predetermined level, the end wall 28 bursts. Pressurized gas then flows from the chamber 16 through the manifold 40 to the gas flow openings 35 in the diffuser 32, and through the gas flow openings 35 into the vehicle occupant restraint 12.

Figure 5:
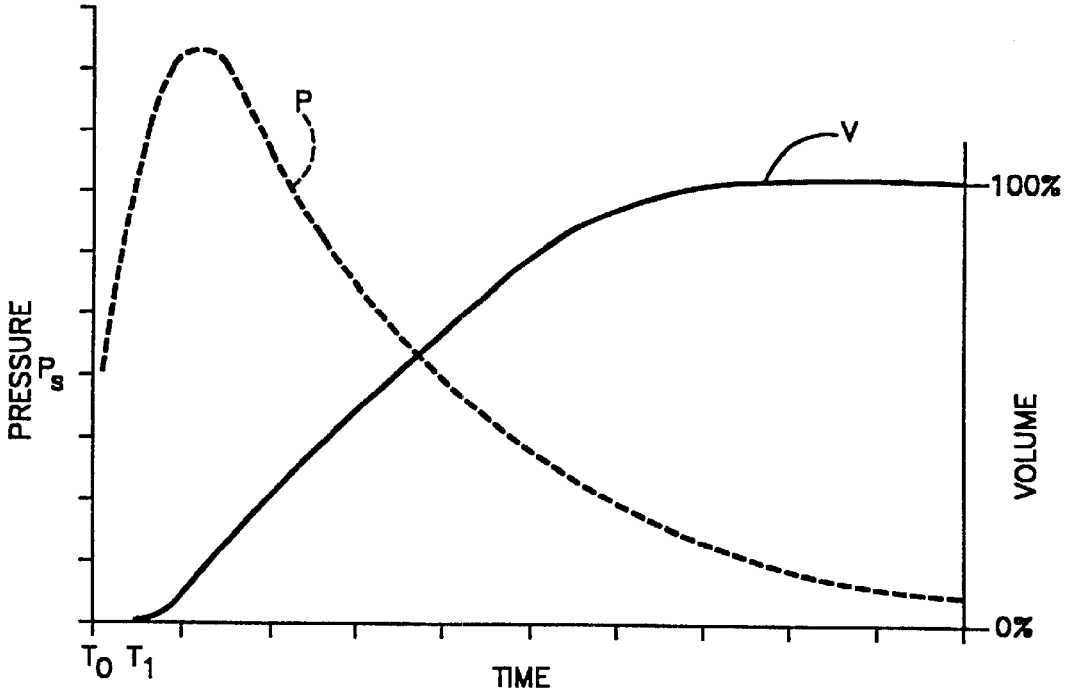
FIG. 5 is a graphic illustration of performance characteristics of a typical vehicle occupant safety apparatus constructed in accordance with the invention.

FIG. 5 illustrates graphically the relationship between the pressure in the chamber 16 and the volume of gas in the vehicle occupant restraint 12 during operation of the vehicle occupant safety apparatus 10. The pressure in the chamber 16 is represented in FIG. 5 by the curve P. The scale for the curve P is shown on the left side of FIG. 5. The volume of gas in the vehicle occupant restraint 12 is represented in FIG. 5 by the curve V. The scale for the curve V is shown on the right side of FIG. 5. At time $T_0$, the fuel gas in the mixture 18 of gases in the chamber 16 is ignited, and the pressure in the chamber 16 begins to increase above the storage pressure $P_s$ as a result of the combustion. At time $T_1$, the end wall 28 bursts and the pressurized gas begins to flow into the vehicle occupant restraint 12. The volume of gas in the vehicle occupant restraint 12 then begins to increase, as indicated by the curve V. The pressure in the chamber 16 initially remains constant of continues to rise after the end wall is opened since the combustion process continues to generate heat and causes the gas mixture to expand at a rate faster than the gas flows out through the orifice 44 into the vehicle occupant restraint 12. As the combustion nears completion, the pressure in the chamber 16 decreases as the pressurized gas moves from the chamber 16 into the vehicle occupant restraint 12. As the pressure in the chamber 16 decreases, the volume of gas in the vehicle occupant restraint 12 increases until the vehicle occupant restraint 12 is fully inflated for the purpose of restraining a vehicle occupant.

FIG. 5 is merely representative of the operation of a vehicle occupant restraint inflator in accordance with the present invention. The curves shown in FIG. 5 can be modified in a number of ways to tailor the volume versus time curves so that inflation of the vehicle occupant restraint may be tailored for a specific application for a specific vehicle. For example, the time to inflate the vehicle occupant restraint 12 fully can be reduced by increasing the fuel gas content of the mixture 18 of gases and/or by increasing the oxidizer gas content. Additionally or alternatively, the number of locations at which the fuel gas in the mixture 18 of gases is ignited and/or the area of the control orifice 44 can be increased. Further, combination of these changes can be used to decrease the time to inflate the vehicle occupant restraint 17. Conversely, the time to inflate the vehicle occupant restraint 12 fully can be increased by, for example, decreasing the fuel gas content and/or the oxidizer gas content of the mixture 18 of gases.

Embodiment I described above is the preferred embodiment of the present invention. Below are descriptions of other embodiments of the present invention which are alternative ways to practice the invention.

Embodiment II

Figure 2:
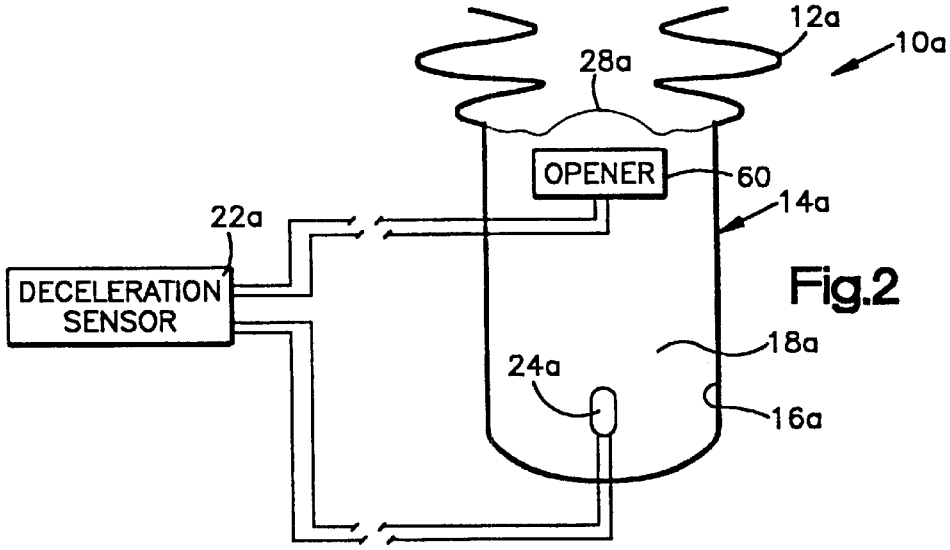
FIG. 2 is a schematic illustration of a second embodiment of the present invention.

Since the embodiment of the invention illustrated in FIG. 2 is generally similar to the embodiment of the invention illustrated in FIG. 1, similar numerals are utilized to designate similar components, the suffix letter "a" is added to the numerals designating the components of the embodiment of the invention illustrated in FIG. 2 to avoid confusion.

A vehicle safety apparatus 10a (FIG. 2) includes an inflatable vehicle occupant restraint 12a which is inflated by a flow of a gas from a container 14a. The container 14a has a chamber 16a in which a mixture 18a of gases is held. Like the mixture 18, the mixture 18a of gases includes a fuel gas, an oxidizer gas for supporting combustion of the fuel gas, and inert gas. Alternatively, the mixture 18a of gases may be a very fuel lean combustible gas mixture of a fuel gas and an oxidizer gas. Also, the mixture 18a of gases may be under pressure.

Upon the occurrence of a high rate of vehicle deceleration, a deceleration sensor 22a activates an opener 60 to puncture mechanically an end wall 28a of the container 14a. The opener 60 can comprise a piston which is moved against the end wall 28 by an explosive charge. Preferably, at the same time, the deceleration sensor 22a activates an igniter 24a to ignite the fuel gas in the mixture 18a of gases. Thus, in the embodiment of the invention illustrated in FIG. 2, the container 14a is opened by the opener 60 simultaneously with ignition of the fuel gas in the mixture 18a of gases by the igniter 24a. Alternatively, the mixture of gases may be ignited a short time after the puncturing of the end wall in order to get a slightly "softer" of slower initial flow of gas into the vehicle occupant restraint. Additionally, the mixture of gases may be ignited prior to opening the end wall [28] *28a*. As the fuel gas burns, the gas in the chamber 16a is heated. The heated gas flows from the chamber 16a through the opening in the end wall 28a of the container 14a into the vehicle component restraint 12a to inflate the vehicle occupant restraint.

The mixture 18a of gases could have many different compositions. The preferences for composition of the mixture 18a of gases are the same as those described above concerning the mixture 18. In one specific embodiment, the mixture 18a of gases includes dry air to which approximately eleven molar percent hydrogen gas is added as the fuel gas. Prior to opening of the container 16a by the opener 60 and ignition of the hydrogen gas in the mixture 18a of gases, the mixture 18a of gases is held in the container 14a at a pressure of approximately 2,000 psi. The preferences for storage pressure for the mixture 18a of gases also are the same as those described above concerning the mixture 18.

Embodiment III

Figure 3:
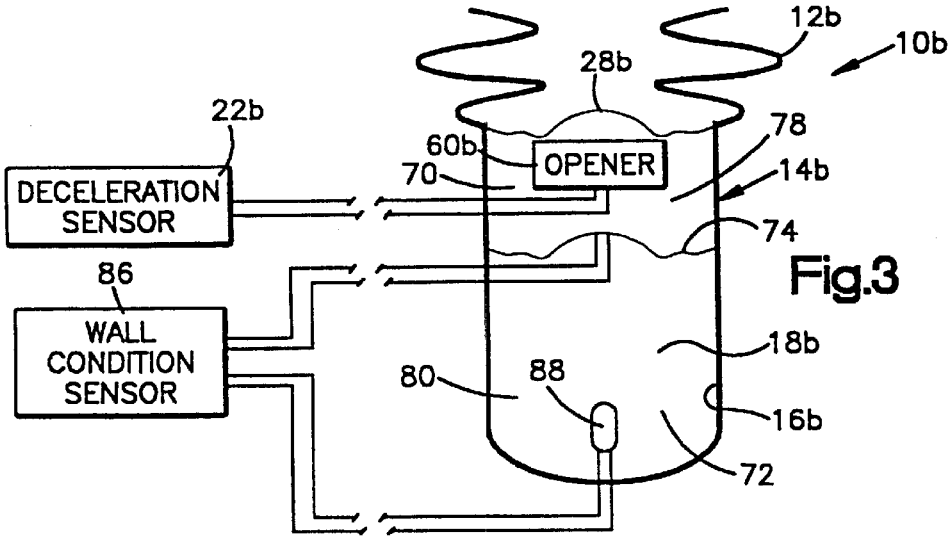
FIG. 3 is a schematic illustration of a third embodiment of the present invention.

A third embodiment of the invention is illustrated in FIG. 3. Since the components of this embodiment of the embodiments of the invention illustrated in FIG. 1 and 2, similar numerals are utilized to designate similar components, the suffix letter "b" is associated with the numerals of FIG. 3 to avoid confusion.

A vehicle safety apparatus 10b (FIG. 3) includes a vehicle component restraint 12b which is inflated by a flow of gas from a container 14b to restrain movement of an occupant of a vehicle. The container 14b includes an upper compartment 70 having an end wall 28b and a lower compartment 72. The upper and lower compartments 70 and 72 are separated from each other by an intermediate wall 74. The upper compartment 70 contains a pressurized gas 78 which is not combustible. The lower compartment 72 contains a pressurized mixture 80 of gases. The mixture 80 of gases preferably contains a fuel gas, an inert gas and an oxidizer gas for supporting combustion of the fuel gas in a mixture with the inert gas. Alternatively, the mixture 80 of gases may be an oxidizer gas and a fuel gas in amounts which provide a very fuel lean mixture.

Upon the occurrence of sudden vehicle deceleration, a deceleration sensor 22b activates an opener 60b to puncture the container end wall 28b mechanically. Since the gas 78 in the upper compartment 70 is held under pressure, the gas 78 flows from the upper compartment 70 into the vehicle occupant restraint 12b when the end wall 28b is punctured.

As the gas 78 flows from the upper compartment 70 into the vehicle occupant restraint 12b, the pressure in the upper compartment 70 is reduced. Consequently, the pressure differential between the mixture 80 of gases in the lower compartment 72 and the gas 78 in the upper compartment 70 increases. When a predetermined pressure differential has been established between the gases in the upper and lower compartments 70 and 72, the intermediate wall 74 bursts to connect the lower compartment 72 in fluid communication with the upper compartment 70. This results in the lower compartment 72 being connected in fluid communication with the vehicle occupant restraint 12b through the upper compartment 70.

Bursting of the intermediate wall 74 by the pressure differential is detected by a sensor 86. Alternatively, the sensor 86 may detect that the wall 74 has deflected beyond a certain preset position. Upon detecting that the intermediate wall 74 has burst or deflected beyond a certain preset position, the sensor 86 activates an igniter 88 to ignite the fuel gas in the mixture 80 of gases. Ignition and the resulting burning of the fuel gas in the mixture 80 of gases heats the gas in the lower compartment 72. As the gas in the lower compartment 72 is heated, the pressure in the lower compartment 72 increases. Therefore, the rate of flow of gas through the intermediate wall[.] 74 and the end wall 28b to the vehicle occupant restraint 12b increases and the volume of gas available for inflating the vehicle occupant restraint 12b increases.

The upper compartment 70 may be filled with dry air at a pressure of 2,000 psi. The mixture of gases in the lower compartment 72 could have many different composition at different pressures. The lower compartment 72 may be filled with a mixture of gases at a pressure of 2,000 psi. The mixture 80 of gases in the lower compartment 72 may consist of 85 to 90 molar percent dry air and 10 to 15 molar percent hydrogen gas. It is contemplated that the upper compartment 70 could be filled with nitrogen gas and the lower compartment 72 could be filled with a mixture of nitrogen gas, hydrogen gas, and an oxidizer gas. The mixture of gases in the lower compartment 72 could also have any composition and/or storage pressure described above concerning the mixture 18 of gases in the embodiment of FIG. 1.

Although it is preferred to connect the lower compartment 72 in fluid communication with the upper compartment 70 and the vehicle occupant restraint 12b by rupturing the intermediate wall 74 when a predetermined pressure differential is established between the upper and lower compartments 70 and 72, the upper and lower compartments 70 and 72 of the container 14b could be connected in fluid communication in a different manner. For example, an opener, similar to the opener 60b, could be provided to puncture the intermediate wall 74 mechanically. Operation of the opener to puncture the intermediate wall 74 and simultaneous operation of the igniter 88 to ignite the fuel gas in the mixture 80 of gases would take place at a predetermined time interval after the deceleration sensor 22b detects the occurrence of sudden vehicle deceleration.

Embodiment IV

Figure 6:
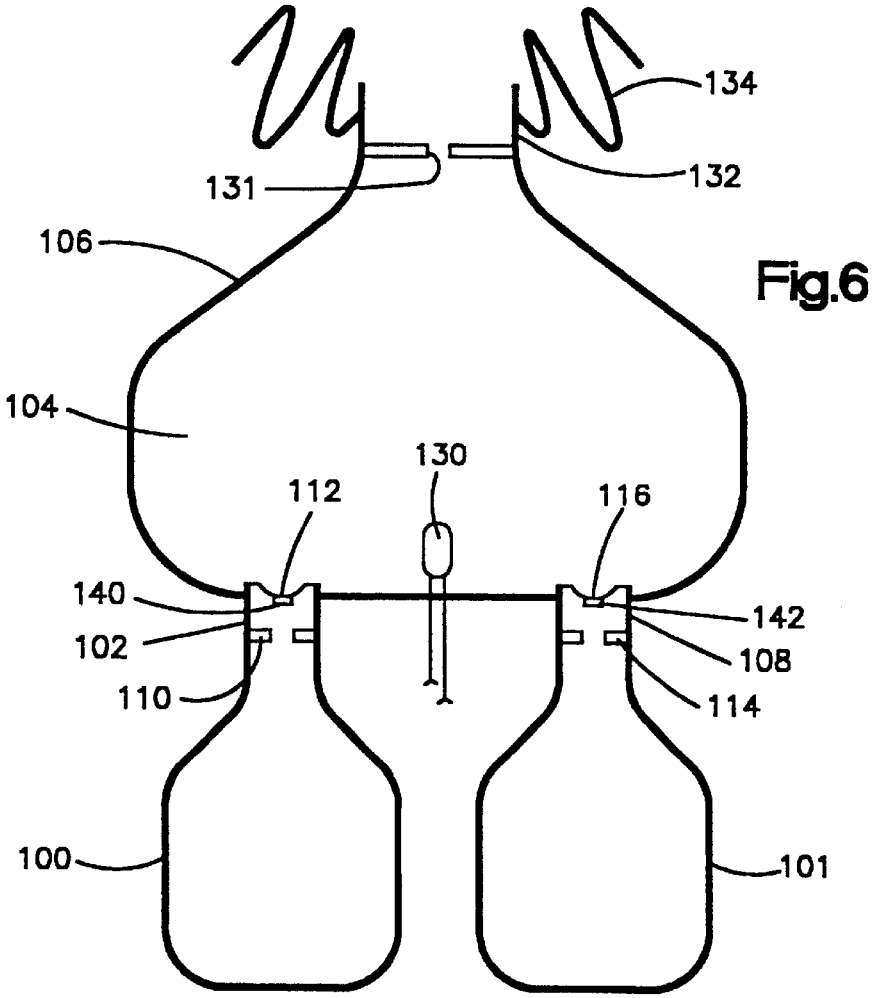
FIG. 6 is a schematic illustration of a fourth embodiment of the present invention.

A fourth embodiment of the invention is illustrated in FIG. 6. In this embodiment, hydrogen is stored under pressure in a container 100, and oxygen is stored under pressure in a container 101. Container 100 has an outlet 102 in communication with a combustion chamber 104 defined by a containing means 106. The container 101 also has an outlet 108 in communication with the combustion chamber 104.

The outlet 102 has a flow control orifice 110 and a burst disk 112. When the burst disk 112 opens, hydrogen flows into the combustion chamber 104 of the containing means 106. The flow of hydrogen is controlled, in part, by the area of the flow control orifice 110. The outlet 108 has a flow control orifice 114 and a burst disk 116. When the burst disc 116 opens, oxygen flows into the combustion chamber 104 of the containing means 106. The flow of oxygen is controlled, in part, by the area of the flow control orifice 114. Thus, when the burst disks 112, 116 open, the containing means 106 receives gases, i.e., hydrogen and oxygen, to provide a combustible mixture of hydrogen and oxygen.

A suitable igniter 130 is associated with the containing means 106. The igniter 130, when actuated, ignites the mixture of gases in the combustion chamber 104 of the containing means 106 to increase the pressure and warm the gas in the combustion chamber 104. The gas is directed from the combustion chamber 104 through a flow control orifice 131 and an outlet conduit 132 into the inflatable vehicle occupant restraint 134. The flow control orifice 131 in part controls the gas flow rate to the inflatable occupant restraint and the pressure in the combustion chamber 104. The inflatable vehicle occupant restraint 134 may be as described above in embodiment I.

A suitable opener device 140 is associated with the burst disk 112. When the opener device 140 is actuated, the burst disk 112 is opened. Also, a suitable opener device 142 is associated with burst disk 116. When the opener device 142 is actuated, the burst disk 116 is opened.

The opener devices 140, 142 are actuated by a vehicle deceleration sensor sensing rapid vehicle deceleration as indicative of a collision. As a result, the hydrogen and oxygen flow into and mix together in combustion chamber 104. The vehicle deceleration sensor also actuates the igniter 130 which, in turn, ignites the mixture of hydrogen and oxygen in the combustion chamber 104. Ignition of the mixture of gases in the combustion chamber 104 warms the gas and increases the pressure of the gas in the combustion chamber 104. The gas then flows into the vehicle occupant restraint 134.

The amount of hydrogen and oxygen which are stored in containers 100, 101 may vary. It is desired that the amount of hydrogen in the combustion chamber 104 is approximately 10 molar percent of the total of the hydrogen and oxygen in the combustion chamber 104 and the amount of oxygen in the combustion chamber 104 is approximately 90 molar percent of the total of the hydrogen and oxygen in the combustion chamber 104. This provides oxygen substantially in excess of that needed to support combustion of the hydrogen. Thus, the vehicle occupant restraint is inflated by the oxygen and products of combustion of the mixture of gas in the combustion chamber 104. The products of combustion include water vapor.

Embodiment V

Figure 7:
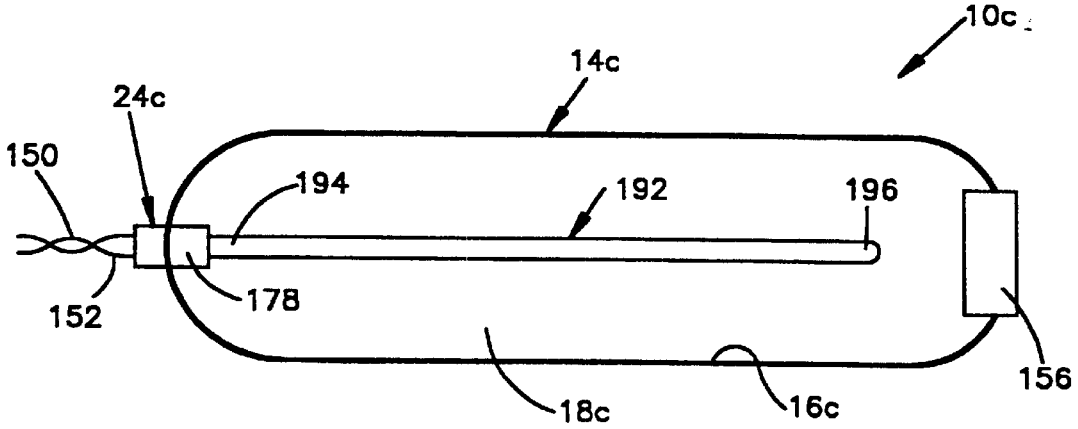
FIG. 7 is a schematic illustration of a fifth embodiment of the present invention.
Figure 8:
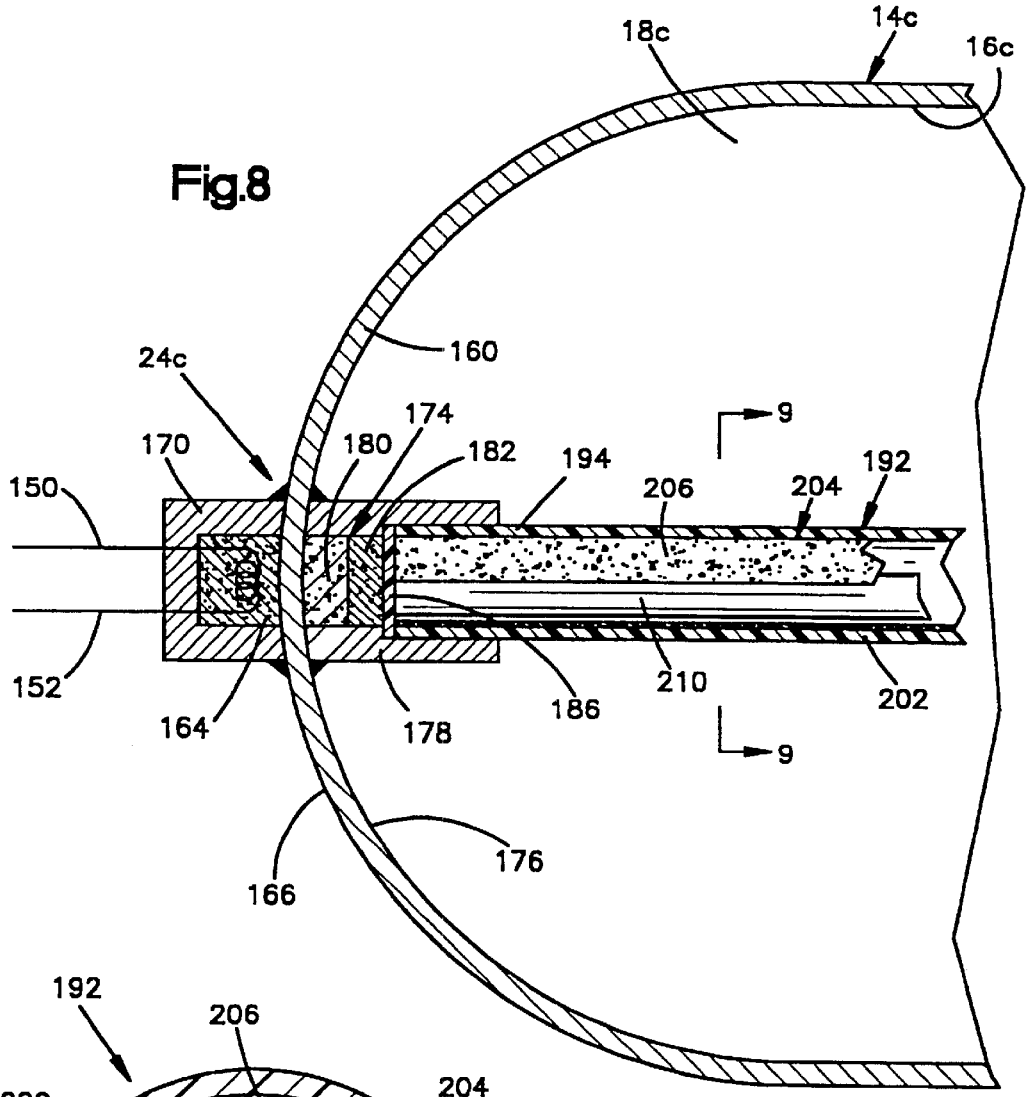
FIG. 8 is an enlarged fragmentary schematic illustration of a portion of the apparatus of FIG. 7.
Figure 9:
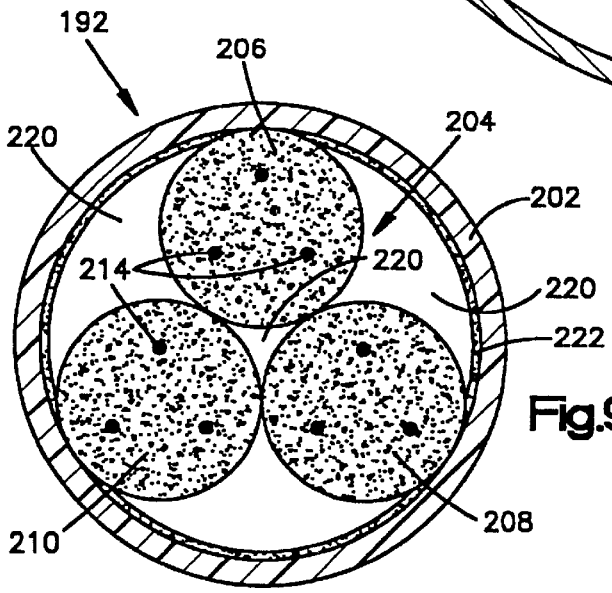
FIG. 9 is a sectional view, taken generally along the line 9—9 of FIG. 8.

A fifth embodiment of the invention is illustrated in FIGS. 7, 8 and 9. Since the components of this embodiment of the invention are generally similar to the components of the embodiment of the invention illustrated in FIGS. 1–4, similar numerals will be utilized to designate similar components, the suffix letter "c" is associated with the numerals of FIGS. 7–9 to avoid confusion.

A vehicle safety apparatus 10c (FIG. 7) includes a vehicle occupant restraint (not shown) which is inflated by a flow of gas from a container 14c. The container 14c has a chamber 16c which holds a mixture 18c of gases. The mixture 18c of gases preferably includes a fuel gas, an oxidizer gas for supporting combustion of the fuel gas, and an inert gas. Alternatively, the mixture 18c of gases in the container 14c may be an oxidizer gas and a fuel gas in amounts which provide a very fuel lean mixture, i.e., the amount of oxidizer gas exceeds the amount required to support combustion of the fuel gas.

The mixture 18c of gases in the container 14c combusts, when ignited, but otherwise is not explosive. The mixture 18c of gases in the container 14c is normally under pressure. The mixture 18c of gases has the same composition as the mixture 18 of gases described in conjunction with the embodiment of the invention illustrated in FIGS. 1–4.

Upon the occurrence of sudden vehicle deceleration, a deceleration sensor (not shown), of any known and suitable construction, transmits a signal over conductors 150 and 152 to activate an igniter 24c. Activation of the igniter 24c ignites the fuel gas in the mixture 18c of gases. The combustion of the fuel gas in the mixture 18c is supported by the oxidizer gas. As the fuel gas burns, the pressure in the chamber 16c rises due to heat supplied by the igniter 24c and by the burning of the fuel gas.

When a predetermined pressure is reached in the chamber 16c, or after a predetermined time, a burst disk (not shown) in a burst disk assembly 156, bursts and warm gas flows into the vehicle occupant restraint through one or more flow controlling orifices. As the gas flows into the vehicle occupant restraint, the gas inflates the vehicle occupant restraint into a predetermined position for restraining a vehicle occupant In accordance with a feature of this embodiment of the invention, the igniter 24c is operable to transmit energy through an imperforate wall portion 160 (FIG. 8) of the container 14c to effect ignition of the mixture 18c of gases in the container 14c. The igniter 24c includes an ignitable outer charge 164 disposed adjacent to an importance outer side surface 166 of the wall portion 160. The outer charge 164 is enclosed by a cylindrical metal housing 170 which is welded to the imperforate outer side 166 of the wall portion 160. The outer charge 164 engages the imperforate outer side 166 of the wall portion 160.

An ignitable inner charge 174 is disposed in engagement with an imperforate inner side 176 of the wall portion 160. The inner charge 174 is enclosed in a cylindrical metal housing 178 which is welded to the imperforate inner side 176 of the wall portion 160. A circular sealing disk 186 blocks exposure of the inner charge 174 to the mixture of gases in the chamber 18c.

In one specific embodiment of the invention, the ignitable outer charge 164 may be RDX (Royal Danish Explosive). However, HMX (Her Majesty's Explosive) could be utilized if desired. The outer charge 164 and inner charge 174 both have a cylindrical configuration with a diameter of about 0.100 inches.

In the specific illustrated embodiments of the invention, the inner charge 174 is in two sections, a cylindrical outer section 180 and a cylindrical inner section 182. The outer section 180 is made of pentaerythritol tetranitrate. The inner section 182 is made of boron potassium nitrate ($BKNO_3$). In this specific embodiment of the invention, the cylinder 14c is formed of 304 stainless steel vacuum arc remelt. The portion 160 of the cylinder wall between the outer charge 164 and the inner charge 174 has a thickness of about 0.085 inches.

The igniter 24c also includes an elongated ignition line 192. The ignition line 193 has an end portion 194 disposed adjacent to the inner charge 174 and sealing disk 186. The end portion 194 (FIG. 8) of the ignition line 192 is telescopically mounted in the housing 178 so that the end of the ignition line 192 is in abutting engagement with the sealing disk 186 and is closely adjacent to the inner charge 174. The ignition line 192 has a longitudinal central axis which is coincident with a longitudinal central axis of the container 14c. The ignition line 192 extends from the housing 178 through a central portion of the container 14c toward a right (as viewed in FIG. 7) end portion of the container. Thus, the ignition line 192 has an end portion 196 (FIG. 7) disposed adjacent to the burst disk assembly 156.

Although the end portion 196 of the ignition line 192 is shown in FIG. 7 as being unsupported, a support could be provided on the inner side of the burst disk assembly 156 or the side wall of the container 14c. Also, if desired, the ignition line 192 could be offset to one side of the central axis of the container 14c.

The ignition line 192 (FIG. 8) includes a cylindrical sheath 202. The sheath 202 is fabricated of a frangible material such as plastic, ceramic, or a composite material. An elongated core 204 is disposed within the sheath 202. The core 204 is formed of non-detonative, ignitive material and has a high heat of combustion.

The core 204 is formed in three cylindrical strands 206, 208, and 210 (FIG. 9) which are enclosed by an imperforate cylindrical side wall of the sheath 202. The strands 206, 208 and 210 include longitudinally extending support elements 214 coated with a non-detonative ignitive mixture of powdered fuel, oxidant and a suitable binder. The support elements 214 are fabricated of a material such as glass fibers, metal or a polymeric material.

The area bounded by the sheath 202 is larger than the transverse cross-sectional area of the core 204. Therefore, there are spaces 220 between the core strands 206, 208, 210 and the sheath 202 and between the core strands themselves. An adherent powdery ignition layer 222, composed of the same material as the strands 206, 208, 210, is disposed on the inner side of the sheath 202.

The ignition line 192 is commercially available from Explosive Technology in Fairfield, Calif. and is known as ITLX. Although the ignition line 192 has been disclosed as having a cylindrical sheath 202 and a core 204 formed of three strands 206, 208 and 210, it is contemplated that the ignition line 192 could have many different constructions, such as those shown in U.S. Pat. No. 4,220,087, issued Sep. 7, 1980 and entitled "Linear Ignition Fuse".

Upon the occurrence of sudden vehicle deceleration, the deceleration sensor (not shown) transmits a signal over the lines 150 and 152 to effect ignition of the outer charge 164. Ignition of the outer charge 164 results in vibration of the imperforate wall portion 160 of the container 14c. The force transmitted by vibration of the wall portion 160 between the charges 164 and 174 causes ignition of the section 180 of the inner charge 174. The ignites the charge section 182. Ignition of the charge sections 180 and 182 of the inner charge 174 destroys the sealing disk 186 and ignites the core 204 at the end portion 194 of the ignition line 192.

Upon ignition of the core 204, the ignition reaction is propagated at a very high speed, on the order of 1,000–5,000 meters per second, along the ignition line 192. As the reaction travels along the ignition line 192, the sheath 202 is shattered. Shattering the sheath 202 results to small, incandescent particles of reaction products being radically projected from the ignition line 192.

Heat provided by the ignition of the ignition line 192 quickly heats the gas immediately adjacent to the surface of the sheath 202 to a temperature of approximately 1,000° F. This ignites the combustible mixture 18c of gases in the chamber 16c. In addition, the small, incandescent particles of reaction products projected from the ignition line 192 as the sheath 202 is shattered are effective to ignite the mixture 18c of combustible gases at locations speed from the ignition line.

Thus, the ignition line 192 performs the dual functions of heating the mixture 18c of gases in the container 14c and of igniting the mixture of gases. Since the ignition line 192 adds a substantial amount of heat to the mixture 18c of gases, a lower amount of the fuel gas is required than would be the case if a different type of igniter was utilized.

From the above description of the invention, those skilled in the art will perceive applications, improvements, changes and modifications to the present invention. For example, the gas in the container 101 (FIG. 6) might include an inert gas, such as nitrogen, as well as oxygen. In an alternative to the FIG. 6 embodiment, an inert gas might be stored under pressure in a separate container similar to the container 100 and 101. The apparatus of the present invention may also be used for inflating devices other than an inflatable vehicle occupant restraint known as an air bag. For example, the apparatus of the present invention may be used to inflate an inflatable vehicle seat belt, a raft, an escape chute, etc. Such applications, improvements, changes and modifications within the skill of the art are intended to be covered by the appended claims.

Having described the invention, the following is claimed:

1. An apparatus for inflating a vehicle occupant restraint, said apparatus comprising:

gas containing means having a single cavity for containing a mixture of gases;

a mixture of gases in said single cavity consisting of a combustible mixture of gases comprising the only stored gases for filling the vehicle occupant restraint;

igniter means which ignites the combustible mixture of gases in said single cavity and forms an occupant restraint inflating gas from said combustible mixture of gases, said occupant restraint inflating gas comprising the ignited combustible mixture of gases; and directing means which directs said occupant restraint inflating gas, which comprises the ignited combustible mixture of gases, from said single cavity to said vehicle occupant restraint to inflate said vehicle occupant restraint.

2. An apparatus as defined in claim 1 further including a vehicle deceleration sensor and wherein said igniter means includes means for igniting the mixture of gases in response to sudden vehicle deceleration sensed by said deceleration sensor.

3. An apparatus as defined in claim 1 wherein said mixture of gases includes an inert gas, a fuel gas, and an oxidizer gas for supporting combustion of said fuel gas.

4. An apparatus as defined in claim 3 wherein said containing means comprises a single container for containing said inert gas, said fuel gas, and said oxidizer gas.

5. An apparatus as defined in claim 4 wherein the containing means is at a pressure of approximately 500 to 5,000 psi.

6. An apparatus as defined in claim 3 wherein the relative amounts of inert gas, fuel gas, and oxidizer gas are selected to yield upon combustion of the fuel gas a predetermined volumetric flow rate of heated gas to inflate the vehicle occupant restraint.

7. An apparatus as defined in claim 3 wherein said fuel gas is selected from the group consisting of hydrogen and a gaseous hydrocarbon, said oxidizer gas is oxygen, and said inert gas is selected from the group consisting of nitrogen and argon.

8. An apparatus as defined in claim 3 wherein said fuel gas is hydrogen comprising about 10 to 14 molar percent of the mixture of said gases, said oxidizer gas is oxygen comprising about 15 to 25 molar percent of the mixture of said gases, and said inert gas is nitrogen comprising about 61–75 molar percent of the mixture of said gases.

9. An apparatus as defined in claim 1 wherein said mixture of gases consists of a lean mixture of a fuel gas and an oxidizer gas.

10. An apparatus as defined in claim 9 wherein said containing means comprises a single container for said mixture of gases of said fuel gas and said oxidizer gas.

[11. An apparatus as defined in claim 9 further including a first container for said fuel gas, a second container for said oxidizer gas, and means for directing fuel gas and oxidizer gas from said first and second containers into a combustion chamber defined by said containing means.]

[12. An apparatus as defined in claim 11 wherein said igniter means ignites the mixture of gases in said combustion chamber.]

[13. An apparatus as defined in claim 12 wherein said directing means directs gas from said combustion chamber into said vehicle occupant restraint.]

14. An apparatus as defined in claim 1 wherein said igniter means includes an elongate heat source which extends from one end portion of said containing means through a central portion of said containing means.

15. An apparatus as set forth in claim 14 wherein said containing means has a longitudinal central axis, said elongate heat source being disposed on the longitudinal central axis of said containing means.

16. An apparatus as set forth in claim 1 wherein said igniter means includes an elongate core disposed in a frangible sheath in said containing means, and means for initiating burning of said core with a resultant shattering of said sheath and spewing of incandescent reaction products into the combustible mixture of gases along the length of said elongated core.

17. An apparatus as set forth in claim 1 wherein said containing means includes an imperforate wall portion, said igniter means includes a first ignitable charge disposed adjacent to a first side of said imperforate wall portion and a second ignitable charge disposed adjacent to a second side of said imperforate wall portion.

18. An apparatus as set forth in claim 1 wherein said containing means includes an imperforate wall portion, said igniter means includes a source of energy disposed adjacent to a first side of said imperforate wall portion, and means disposed adjacent to a second side of said imperforate wall portion and actuatable due to energy transmitted through said imperforate wall portion to effect ignition of the combustible mixture of gases.

19. An apparatus for inflating a vehicle occupant restraint as defined in claim 1 wherein said igniter means forms an occupant restraint inflating gas consisting of the ignited combustible mixture of gases and said directing means directs said occupant restraint inflating gas consisting of said ignited combustible mixture of gases to inflate said vehicle occupant restraint.

20. An apparatus for inflating a vehicle occupant restraint, said apparatus comprising:

a container having an imperforate wall portion with inner and outer sides;

an ignitable gaseous material consisting of a combustible mixture of gases disposed in said container;

igniter means for igniting the combustible mixture of gases, said igniter means igniting the combustible mixture of gases in said container to effect a flow of the ignited combustible mixture of gases from said container, said igniter means including a source of energy disposed adjacent to the outer side of said imperforate wall portion of said container and means disposed adjacent to the inner side of said imperforate wall portion of said container and actuatable due to the energy transmitted through said imperforate wall portion of said container to effect ignition of the ignitable gaseous material in said container, and directing means for directing the ignited combustible mixture of gases from said container to said vehicle occupant restraint to inflate said vehicle occupant restraint.

21. An apparatus as set forth in claim 20 wherein said source of energy includes a first ignitable charge and said means disposed adjacent to the inner side portion of said imperforate wall portion of said container includes a second ignitable charge which is ignited under the influence of vibrations transmitted through said imperforate wall portion of said container in response to ignition of said first ignitable charge.

22. An apparatus as set forth in claim 21 wherein said igniter means includes an elongate heat source which extends from a location adjacent to said second ignitable charge through a central portion of said container to enable heat to be transferred from said elongate heat source to the ignitable material along the length of said elongate heat source.

23. An apparatus as set forth in claim 22 wherein said container has a longitudinal central axis, said elongate heat source being disposed on the longitudinal central axis of said container.

24. An apparatus as set forth in claim 20 wherein said igniter means includes an elongate core disposed in a frangible sheath in said container, said means disposed adjacent to the inner side of said imperforate wall being operable to initiate burning of said core with a resultant shattering of said sheath and spewing of incandescent reaction products into the ignitable material in said container.

25. An apparatus as set forth in claim 24 wherein said container has a longitudinal central axis, said elongate core and frangible sheath being disposed on the longitudinal central axis of said container.

26. An apparatus as set forth in claim 24 wherein said elongate core and frangible sheath extend from one end portion of said container through a central portion of said container to enable incandescent reaction products to be spewed toward said ignitable material in at least the one end portion and central portion of said container.

27. An apparatus for inflating a vehicle occupant restraint, said apparatus comprising:

[containing means including a gaseous] *a container storing a* mixture of gases [consisting of] *including* a fuel gas, an inert gas and an oxidizer gas;

igniter means for igniting the fuel gas [and which ignites the fuel gas in said containing means] to heat the mixture of gases in said [containing means;] *container;* and directing means for directing the heated mixture of gases from said [containing means] *container* to said vehicle occupant restraint to inflate said vehicle occupant restraint.

28. An apparatus for inflating a vehicle occupant restraint, said apparatus comprising:

containing means for containing a combustible[,] mixture of gases;

a combustible[,] mixture of gases in said containing means;

means separate from and independent of said combustible mixture of gases for opening said containing means and for igniting the combustible mixture of gases to heat the gases in said containing means; and directing means for directing the heated mixture of gases from said containing means to said vehicle occupant restraint to inflate said vehicle occupant restraint.

29. A method of inflating a vehicle occupant restraint, said method comprising:

providing a mixture of gases consisting of a combustible mixture of gases in a single cavity in a container, said combustible mixture of gases being the only stored gases for inflating the vehicle occupant restraint;

igniting the combustible mixture of gases in the single cavity to form an occupant restraint inflating gas from said combustible mixture of gases and comprising the ignited combustible mixture of gases; and directing the occupant restraint inflating gas, which comprises the ignited combustible mixture of gases, from the single cavity to the vehicle occupant restraint to inflate the vehicle occupant restraint.

30. A method as set forth in claim 29 wherein said step of providing a combustible mixture of gases includes providing an inert gas, a fuel gas and an oxidizer gas, said step of igniting the combustible mixture of gases includes burning the fuel gas.

[31. A method as set forth in claim 29 wherein said step of providing a combustible mixture of gases includes the step of storing a fuel gas in one container, storing an oxidizer gas in another container, and mixing the fuel and oxidizer gases to form the combustible mixture of gases in response to sudden vehicle deceleration.]

32. A method as set forth in claim 29 further including the step of sensing the occurrence of sudden vehicle deceleration and performing said step of igniting the combustible mixture of gases in response to performance of said step of sensing the occurrence of sudden vehicle deceleration.

33. A method as set forth in claim 29 further including the step of burning in the container at least a portion of one of the gases in the combustible mixture of gases.

34. A method as set forth in claim 29 wherein said step of igniting the combustible mixture of gases in the container includes transmitting energy through an imperforate portion of a wall of the container.

35. A method as set forth in claim 29 wherein said step of igniting the combustible mixture of gases in the container includes igniting a first charge disposed outside of the container, and igniting a second charge disposed inside the container under the influence of force transmitted through an imperforate wall portion of the container from the first charge to the second charge.

36. A method as set forth in claim 29 wherein said step of igniting the combustible mixture of gases in the container includes spewing incandescent materials into the mixture of gases in the container along an elongate path extending from one end portion of the container through a central portion of the container.

37. A method of inflating a vehicle occupant restraint as defined in claim 29 wherein said step of forming an occupant restraint inflating gas includes forming an occupant restraint inflating gas consisting of the ignited combustible mixture of gases.

38. A method of inflating a vehicle occupant restraint, said method comprising the steps of:

[providing a gaseous] *storing a* mixture of gases in a container, said mixture of gases [consisting of] *including* a fuel gas, an inert gas and an oxidizer gas;

igniting the fuel gas in the container to heat the mixture of gases in the container; and directing the mixture of gases from the container to the vehicle occupant restraint to inflate the vehicle occupant restraint.

39. A method of inflating a vehicle occupant restraint, said method comprising the steps of:

[providing] *storing* a combustible mixture of gases in a container;

providing a means separate from and independent of the combustible mixture of gases for opening the container;

opening the container by said means separate from and independent of the combustible mixture of gases;

igniting the combustible mixture of gases to heat the gases in the container;

directing the heated mixture of gases from the container to the vehicle occupant restraint to inflate the vehicle occupant restraint.

40. An apparatus for inflating a vehicle occupant restraint, said apparatus comprising:

gas containing means having a chamber for containing a mixture of gases;

a mixture of gases in said chamber consisting of a homogeneous, combustible mixture of gases for filling the vehicle occupant restraint, said combustible mixture of gases including an ignitable fuel gas and being a fuel gas lean mixture;

igniter means which ignites the combustible mixture of gases in said chamber and forms an occupant restraint inflating gas from said combustible mixture of gases, said occupant restraint inflating gas comprising the ignited combustible mixture of gases; and directing means for directing said occupant restraint inflating gas, which comprises the ignited combustible mixture of gases, from said chamber to said vehicle occupant restraint to inflate said vehicle occupant restraint.

41. An apparatus as defined in claim 40 wherein said igniter means forms an occupant restraint inflating gas consisting of the ignited combustible mixture of gases.

42. A method of inflating a vehicle occupant restraint, said method comprising:

providing a mixture of gases consisting of a homogeneous, combustible mixture of gases in a chamber in a container, said combustible mixture of gases being for inflating the vehicle occupant restraint, said combustible mixture of gases including an ignitable fuel gas an being a fuel gas lean mixture;

igniting the combustible mixture of gases to form an occupant restraint inflating gas from said combustible mixture of gases and comprising the ignited combustible mixture of gases; and directing the occupant restraint inflating gas, which comprises the ignited combustible mixture of gases, from the container to the vehicle occupant restraint to inflate the vehicle occupant restraint.

43. A method as defined in claim 42 wherein said step of forming an occupant restraint inflating gas includes forming an occupant restraint inflating gas consisting of the ignited combustible mixture of gases.

44. An apparatus for inflating a vehicle occupant restraint, said apparatus comprising:

first and second separate containers for containing gas;

a fuel gas in said first container;

an oxidizer gas in said second container;

a containing means for receiving said fuel gas and said oxidizer gas from said first and second separate containers when said fuel gas and said oxidizer gas are released from said first and second containers;

means for releasing said fuel gas and said oxidizer gas from said first and second containers for flow into said containing means and providing a combustible mixture of gases *in* said containing means;

igniter means for igniting the combustible mixture of gases in said containing means; and directing means for directing the ignited combustible mixture of gases from said containing means to said vehicle occupant restraint to inflate the vehicle occupant restraint.

45. A method of inflating a vehicle occupant restraint, said method comprising:

providing first and second separate containers for containing gas;

storing a fuel gas in said first container;

storing an oxidizer gas in said second container;

providing a containing means for receiving said fuel gas and said oxidizer gas from said first and second separate containers when said fuel gas and said oxidizer gas are released from said first and second containers;

releasing said fuel gas and said oxidizer gas from said first and second containers for flow into said containing means and providing a combustible mixture of gases in said containing means;

igniting the combustible mixture of gases in said containing means; and directing the ignited combustible mixture of gases from said containing means to said vehicle occupant restraint to inflate the vehicle occupant restraint.

46. An apparatus for inflating a vehicle occupant restraint, said apparatus comprising:

first means defining a first chamber for containing a first gas;

second means defining a second chamber for containing a second gas;

a first gas in said first chamber;

a second gas comprising a combustible mixture of gases in said second chamber;

means for releasing at different times the first and second gases for flow from said first and second chambers at said different times;

igniter means for igniting said combustible mixture of gases; and directing means for directing said first gas and said ignited combustible mixture of gases into the vehicle occupant restraint.

47. A method of inflating a vehicle occupant restraint, said method comprising the steps of:

storing a first gas in a first chamber;

storing a second gas in a second chamber, said second gas comprising a combustible mixture of gases;

releasing at different times the first and second gases for flow from said first and second chambers at said different times;

igniting said combustible mixture of gases; and directing said first gas and said ignited combustible mixture of gases into the vehicle occupant restraint.

48. An apparatus for inflating a vehicle occupant restraint, said apparatus comprising:

first means defining a first chamber for containing a first gas;

second means defining a second chamber for containing a second gas;

a first gas in said first chamber;

a second gas comprising a combustible mixture of gases in said second chamber;

first actuatable opener means, for when actuated, opening said first chamber to enable said first gas to flow therefrom;

second actuatable opener means separate from said first actuatable opener means for opening said second chamber to enable said second gas to flow therefrom;

igniter means for igniting said combustible mixture of gases; and directing means for directing said first gas into the vehicle occupant restraint and for directing the ignited combustible mixture of gases into the vehicle occupant restraint.

49. An apparatus for inflating a vehicle occupant restraint, said apparatus comprising:

first means defining a first chamber for containing a first gas;

second means defining a second chamber, larger than said first chamber, for containing a second gas;

a first gas in said first chamber;

a second gas comprising a combustible mixture of gases in said second larger chamber;

actuatable means for, when actuated, enabling said first and second gases to flow from said first and second chambers;

igniter means for igniting said combustible mixture of gases; and directing means for directing said first gas into the vehicle occupant restraint and for directing the ignited combustible mixture of gases into the vehicle occupant restraint.

*50. An apparatus for inflating a vehicle occupant restraint, said apparatus comprising:*

*a container structure defining a combustion chamber, said combustion chamber being bounded by container walls including a non-rupturable tank wall and a rupturable closure wall, said closure wall releasing said gas to exit said combustion chamber upon rupturing of said closure wall;*

*a combustion mixture of gases stored in said container structure, said mixture of gases including a fuel gas, an oxidizer gas, and an inert gas;*

*igniter means for igniting and heating said stored fuel gas inside said combustion chamber upon the occurrence of a vehicle collision, said fuel gas, when ignited, heating said combustible mixture of gases; and*

*directing means for directing inflation gas from said container structure toward the vehicle occupant restraint to inflate the restraint.*

*51. An apparatus as defined in claim 50 wherein said fuel gas is selected from the group consisting of hydrogen and gaseous hydrocarbons.*

*52. An apparatus as defined in claim 50 wherein said fuel gas is stored inside said combustion chamber.*

*53. An apparatus as defined in claim 52 wherein said combustion chamber stores a combustible mixture of gases comprising said fuel gas and an oxidizer gas.*

*54. An apparatus as defined in claim 53 wherein said combustible mixture of gases comprises a fuel lean mixture of said fuel gas and said oxidizer gas.*

*55. An apparatus as defined in claim 53 wherein said combustible mixture of gases further includes an inert gas.*

*56. An apparatus as defined in claim 53 wherein said combustible mixture of gases comprises about 10–14 molar percent of said fuel gas, about 15–25 molar percent of said oxidizer gas, and about 61–75 molar percent of an inert gas.*

*57. An apparatus as defined in claim 50 wherein said fuel gas is stored outside said combustible chamber.*

*58. An apparatus as defined in claim 57 wherein said container structure further defines a compartment which is separated from said combustion chamber by another rupturable closure wall, said compartment containing an oxidizer gas.*

*59. An apparatus as defined in claim 58 wherein said compartment further contains said fuel gas.*

*60. An apparatus as defined in claim 50 further comprising an oxidizer gas stored in said container structure separately from said fuel gas, said container structure including means for rupturing to allow said oxidizer gas to mix with said fuel gas to form a combustible mixture of gases upon the occurrence of a vehicle collision.*

*61. An apparatus as defined in claim 60 further comprising an inert gas stored in said container structure separately from said fuel gas and said oxidizer gas.*

*62. An apparatus as defined in claim 61 wherein said rupturable means allows said inert gas to mix with said oxidizer gas whereby warm inflation gas is formed upon heating of said inert gas with heat of combustion created by burning of said fuel gas in a combustible mixture with said oxidizer gas.*

*63. An apparatus as defined in claim 62 wherein said rupturable means allows said inert gas to mix with said fuel gas before said fuel gas is ignited.*

*64. An apparatus as defined in claim 50 wherein said igniter means comprises means for igniting said fuel gas by transmitting energy from an energy source to said fuel gas through an imperforate wall portion of said container structure.*

*65. An apparatus as defined in claim 50 wherein said igniter means includes means for igniting said fuel gas by spewing incandescent materials into said fuel gas from an elongate combustible means for generating said incandescent materials.*

*66. A method of inflating a vehicle occupant restraint, said method comprising the steps of:*

*storing inflation gas in a container structure having a combustion chamber with an outlet opening and a rupturable closure member blocking said outlet opening, the inflation gas comprising a combustible mixture of gases including a fuel gas, an inert gas, and an oxidizer gas for supporting combustion of the fuel gas;*

*igniting the mixture of gases inside the combustion chamber to provide heat of combustion created by burning of the fuel gas, the mixture of gases, when ignited, inflating the vehicle occupant restraint;*

*forming warm inflation gas by heating the inflation gas in the container structure with the heat of combustion;*

*rupturing the closure member; and*

*directing the warm inflation gas from the container structure toward the vehicle occupant restraint to inflate the restraint.*

*67. A method as defined in claim 66 wherein said step of storing said inflation gas comprises the step of storing said fuel gas and said oxidizer gas separately from each other, said step of forming said warm inflation gas comprising the step of mixing said fuel gas and said oxidizer gas to form a combustible mixture of gases upon the occurrence of a vehicle collision.*

*68. A method as defined in claim 66 wherein said inflation gas further comprises an inert gas, said step of forming said warm inflation gas including heating said inert gas.*

*69. A method as defined in claim 68 wherein said fuel gas and said inert gas are stored separately from each other.*

*70. A method as defined in claim 68 wherein said oxidizer gas and said inert gas are stored separately from each other.*

*71. A method as defined in claim 68 wherein said fuel gas, said oxidizer gas and said inert gas are stored separately from each other.*

*72. A method as defined in claim 66 wherein said step of igniting said fuel gas comprises the step of transmitting energy from an energy source to said fuel gas through an imperforate wall portion of said container structure.*

*73. A method as defined in claim 66 wherein said step of igniting said fuel gas comprises the step of spewing incandescent materials into said fuel gas from an elongate combustible means for generating said incandescent materials.*

*74. An apparatus for inflating a vehicle occupant restraint, said apparatus comprising:*

*a container structure;*

*a mixture of gases stored in said container structure, said stored mixture of gases comprising a combustible mixture of ignitable fuel gas, an inert gas and an oxidizer gas; means for igniting said fuel gas, said fuel gas, when ignited, heating said combustible mixture of gases; and*

*directing means for directing gases from said container structure toward the vehicle occupant restraint to inflate the restraint.*

*75. An apparatus as defined in claim 74 wherein said directing means directs occupant restraint inflating gas from said container structure to the vehicle occupant restraint to inflate the restraint, said occupant restraint inflating gas consisting of said ignited combustible mixture.*

*76. An apparatus as defined in claim 74 wherein said stored mixture of gases consists of said combustible mixture.*

*77. An apparatus as defined in claim 74 wherein said fuel gas comprises about 10–14 molar percent of said combustible mixture, said oxidizer gas comprises about 15 to 25 molar percent of said combustible mixture, and said inert gas comprises about 61–75 molar percent of said combustible mixture.*

*78. An apparatus as defined in claim 74 wherein said combustible mixture comprises a fuel lean mixture of said fuel gas and said oxidizer gas.*

*79. An apparatus as defined in claim 74 wherein said fuel gas is selected from the group consisting of hydrogen and gaseous hydrocarbons.*

*80. An apparatus as defined in claim 74 wherein said igniter means includes an elongate heat source which extends from one end portion of said container structure through a central portion of said container structure.*

*81. An apparatus as defined in claim 80 wherein said container structure has a longitudinal central axis, said elongate heat source being disposed on said longitudinal central axis.*

*82. An apparatus as defined in claim 74 wherein said igniter means includes an elongate core disposed in a frangible sheath in said container structure, and further includes means for initiating burning of said core with a resultant shattering of said sheath and spewing of incandescent reaction products into said combustible mixture along the length of said elongate core.*

*83. An apparatus as defined in claim 74 wherein said container structure has an imperforate wall portion, said igniter means including a source of energy disposed adjacent to a first side of said imperforate wall portion, said igniter means further including actuatable means disposed adjacent to a second side of said imperforate wall portion and actuatable due to energy transmitted through said imperforate wall portion to effect ignition of said combustible mixture.*

*84. An apparatus as defined in claim 83 wherein said source of energy comprises a first ignitable charge adjacent to said first side of said imperforate wall portion, said actuatable means comprising a second ignitable charge disposed adjacent to said second side of said imperforate wall portion.*

*85. An apparatus for inflating a vehicle occupant restraint, said apparatus comprising:*

*a first chamber;*

*a fuel gas stored in said first chamber;*

*a second chamber separated from said first chamber;*

*an oxidizer gas stored in said second chamber, said fuel gas and said oxidizer gas being released for flow into a containing means; and*

*means for causing said stored fuel gas to mix with said oxidizer gas and to ignite producing products of combustion, the mixture of gases in the containing means being ignited,*

*the mixture of gases being directed into the vehicle occupant restraint to inflate the vehicle occupant restraint.*

*86. An apparatus as defined in claim 85 wherein said first and second chambers are respectively defined by first and second containers which are separated from each other.*

*87. An apparatus as defined in claim 85 wherein said stored fuel comprises a fuel gas.*

*88. An apparatus as defined in claim 87 further comprising containing means for receiving said fuel gas and said stored oxidizer gas from said first and second chambers to provide a combustible mixture of gases in said containing means, and an igniter for igniting said combustible mixture of gases in said containing means to produce said products of combustion.*

*89. An apparatus as defined in claim 88 wherein said containing means stores an inert gas.*

*90. An apparatus for inflating a vehicle occupant restraint, said apparatus comprising:*

*a container structure;*

*a combustible mixture of gases in said container structure, said mixture of gases including a fuel gas, an inert gas, and an oxidizer gas for supporting combustion of said fuel gas, said fuel gas being selected from the group consisting of hydrogen and gaseous hydrocarbons;*

*means for igniting said mixture of gases to heat said gases to form occupant restraint inflating gas, said occupant restraint inflating gas comprising the ignited combustible mixture of gases, said fuel gas, when ignited, heating said combustible mixture of gases; and*

*directing means for directing said occupant restraint inflating gas toward the vehicle occupant restraint to inflate said vehicle occupant restraint.*

*91. An apparatus for inflating an inflatable vehicle occupant restraint, said apparatus comprising:*

*a container storing inflation gas for inflating the restraint, said stored inflation gas consisting of a combustible mixture of gases comprising a fuel gas, an inert gas, and an oxidizer gas;*

*igniter means for igniting said combustible mixture of gases upon the occurrence of a vehicle collision, said fuel gas, when ignited, heating said mixture of gases; and*

*directing means for directing said inflation gas from said container toward the restraint to inflate the restraint.*

*92. An apparatus for inflating a vehicle occupant restraint, said apparatus comprising:*

*a container;*

*a combustible mixture of gases in said container, said mixture of gases comprising about 10 to 14 molar percent of fuel gas, about 15 to 25 molar percent of an oxidizer gas and about 61–75 molar percent of an inert gas;*

*means for igniting said fuel gas, said fuel gas, when ignited, heating said mixture of gases to form occupant restraint inflating gas; and*

*directing means for directing said occupant restraint inflating gas from said container toward the vehicle occupant restraint to inflate said vehicle occupant restraint.*

*93. An apparatus for inflating a vehicle occupant restraint, said apparatus comprising:*

*a container;*

*a combustible mixture of gases in said container, said combustible mixture of gases comprising a fuel lean mixture of a fuel gas, an inert gas, and an oxidizer gas;*

*means for igniting said fuel gas, said fuel gas, when ignited, heating said mixture of gases to form occupant restraint inflating gas; and*

*directing means for directing said occupant restraint inflating gas from said container toward the vehicle occupant restraint to inflate said vehicle occupant restraint,*

*said combustible mixture of gases being fuel lean such that said occupant restraint inflating gas is substantially free of fuel gas and includes remaining oxidizer gas.*

*94. An apparatus for inflating a vehicle occupant restraint, said apparatus comprising:*

*a container containing a combustible mixture of gases including a fuel gas, an inert gas and an oxidizer gas, said oxidizer gas being about 15–25 molar percent of said combustible mixture of gases;*

*igniter means for igniting said fuel gas in said container, said fuel gas, when ignited, heating said mixture of gases in said container; and*

*directing means for directing said gases from said container to the vehicle occupant restraint to inflate the vehicle occupant restraint.*

*95. An apparatus as defined in claim 94 wherein said fuel gas is about 10–14 molar percent of said combustible mixture of gases.*

*96. A method of inflating a vehicle occupant restraint, said method comprising the steps of:*

*providing a combustible mixture of gases in a container, the combustible mixture of gases including a fuel gas, an inert gas and an oxidizer gas, the oxidizer gas being about 15–25 molar percent of the combustible mixture of gases;*

*igniting the mixture of gases in the container to heat the mixture of gases in the container, the mixture of gases, when ignited, inflating the vehicle occupant restraint; and*

*directing the heating gases from the container to the vehicle occupant restraint to inflate the vehicle occupant restraint.*

*97. A method as defined in claim 96 wherein said fuel gas is about 10–14 molar percent of said combustible mixture of gases.*

*98. A method of inflating a vehicle occupant restraint, said method comprising the steps of:*

*providing a combustible mixture of gases in a container, the combustible mixture of gases including a fuel gas, an inert gas, and an oxidizer gas, the oxidizer gas being about 15–25 molar percent of the combustible mixture of gases;*

*providing a means separate from and independent of the combustible mixture of gases for opening the container;*

*opening the container by the means separate from and independent of the combustible mixture of gases;*

*igniting the combustible mixture of gases to heat the mixture of gases in the container, the mixture of gases, when ignited, inflating the vehicle occupant restraint; and*

*directing the mixture of gases from the container to the vehicle occupant restraint to inflate the vehicle occupant restraint.*

*99. A method as defined in claim 98 wherein said fuel gas is about 10–14 molar percent of said combustible mixture of gases.*

* * * * *